United States Patent [19]

Ohtsuka et al.

[11] Patent Number: 5,372,406
[45] Date of Patent: Dec. 13, 1994

[54] WHEEL COVER FOR AUTOMOBILE

[75] Inventors: Noboru Ohtsuka; Hisato Yamada; Masakazu Iwatsuki, all of Aichi, Japan

[73] Assignee: Kabushiki Kaisha Tokai Rika Denki Seisakusho, Aichi, Japan

[21] Appl. No.: 144,015

[22] Filed: Nov. 1, 1993

[30] Foreign Application Priority Data

Nov. 4, 1992 [JP] Japan .................. 4-076065
Mar. 10, 1993 [JP] Japan .................. 5-010102

[51] Int. Cl.$^5$ ............................ B60B 7/04
[52] U.S. Cl. ................... 301/37.23; 301/37.1
[58] Field of Search .............. 301/37.1, 37.22, 37.23

[56] References Cited

U.S. PATENT DOCUMENTS 2,964,357 12/1960 Barnes ................ 301/37.23
3,012,821 12/1961 Shoemaker ......... 301/37.23
3,183,038  5/1965 Asile, Jr. ............. 301/37.23

FOREIGN PATENT DOCUMENTS 62-90201 9/1987 Japan .
4012902 1/1989 Japan ................ 301/37.36

Primary Examiner—Russell D. Stormer

[57] ABSTRACT

A wheel cover includes a wheel cover body and a flexible annular member positioned therearound. The wheel cover body is formed in approximately a disk form, and a plurality of a through-holes are formed at the outer periphery thereof. The body of the flexible annular member is formed in a configuration that the inner periphery overlaps the outer periphery of the wheel cover body. On a side of the body, there are formed retaining projections at the position corresponding to the through-holes of the wheel cover body. Each retaining projection has a base portion, an intermediate retainer portion, and an extremity grip portion. The base portion is formed to be engaged with the through-hole. The intermediate retainer portion has a larger cross section than the base portion so as to be constricted to pass through the through-hole when it is pressed into the through-hole and hold the wheel cover body in collaboration with the body when the base portion is engaged in the through-hole. The extremity grip portion has a cross section smaller than that of the through-hole.

6 Claims, 7 Drawing Sheets

WHEEL COVER FOR AUTOMOBILE

BACKGROUND OF THE INVENTION

1. Field of the Invention

The present invention relates to a wheel cover for an automobile, especially to a wheel cover provided with a flexible annular member around the wheel cover body.

2. Description of the Prior Art

Conventionally, there has been proposed a wheel cover for an automobile, a front elevational view of which is shown in FIG. 1. The wheel cover has a hard wheel cover body 101 and a flexible annular member 102 fitted around the periphery of the wheel cover body 101. The wheel cover body 101 is of a size (diameter) that its periphery does not come into contact with a tire (not shown) even when the outer side of the tire swells. This structure prevents the wheel cover from being pushed out by the tire falling off a wheel during the operation of the automobile. For example, this could occur when a tire rides over a curbstone and the outside face of the tire swells. In such a wheel cover, disengagement of the wheel cover can be prevented by the absorption of the ballooning of the outside face of the tire by the elastic deformation of the flexible annular member 102.

According to the wheel cover of the above type, it is necessary to mount the flexible annular member 102 securely to the wheel cover body 101 so that the flexible annular member 102 is not disengaged during the deformation of the tire. For example, in the wheel cover of the type as disclosed in Japanese Patent laid-open Publication No. 90201/1987, the mounting part of the flexible annular member has projections formed on the wheel cover body which are passed through holes formed on the flexible annular member, and the extremity of each projection is caulked to fix the flexible annular member to the wheel cover body. In addition to the caulking of the extremity of the projection, there is also disclosed a means including a member for snap fitting to the extremity of the projection to fix the flexible annular member to the wheel cover body.

However, when mounting the flexible annular member as carried out in the former construction, the mounting work is complicated since caulking of the projection is necessary, and in the latter, there is a disadvantage because a separate mounting member is necessary.

SUMMARY OF THE INVENTION

The present invention has been developed to overcome the above-described disadvantages.

An object of the present invention is to provide structure to easily fix with reliability a flexible annular member to a wheel cover body without complicated mounting work such as work required for caulking and without using a separate mounting member as described above.

Another object of the present invention is to provide a wheel cover having a flexible annular member molded with a mold of a simple structure.

A further object of the present invention is to provide a wheel cover having a flexible annular member which is less easily deformed by heat that may be generated for example, by a brake.

In order to arrive at the above objects, the present invention provides a wheel cover for automobile, having a wheel cover body and a flexible annular member, which has the following structure.

In the wheel cover of the present invention, the wheel cover body is formed in approximately a disk shape and has at its outer periphery a plurality of a through-holes thrusting through in the direction of thickness of the wheel cover body. The flexible annular member that has two faces and has a body having an inner periphery which overlaps the outer periphery of the wheel cover body and retaining projections provided on a second face of the body at the position corresponding to the through-holes of the wheel cover body. Each retaining projection has a base portion, an intermediate retainer portion and an extremity grip portion. The base portion is positioned at the base end of the retaining projection and has a cross section which is substantially equal to that of the through-hole of the wheel cover body. The intermediate retainer portion is positioned on the extremity side of the base portion and has a cross section which is larger at least in the radial direction of the flexible annular member than that of the base portion so as to be constricted when it is pressed into the through-hole to hold the wheel cover body in conjunction with the body when the base portion is engaged in the through-hole. The extremity grip portion is positioned at the extremity end of the retaining projection and has a cross section smaller than that of the through-hole of the wheel cover body. In this structure, the cross section of the retaining projection can be formed in various configurations such as circle or quadruple.

In the above constriction, in mounting the flexible annular member to the wheel cover body, first, each retaining projection of the flexible annular member is positioned corresponding to each through-hole in the wheel cover body, and the extremity grip portions are inserted in the through-holes. Then, each extremity grip portion is pulled from the side opposite to the side of insertion into the wheel cover body to drawn the intermediate retainer portion into the through-hole while constricting it. Further, by proceeding to pull the extremity grip portion, the intermediate retainer portion is drawn out from the through-hole. At this time, the outer shape of the constricted intermediate retainer portion is reinstated to the original size, and the base portion is engaged with the through-hole. Consequently, the flexible annular member is maintained in a state where it holds the wheel cover body from both sides with the inner periphery thereof and the intermediate retainer portion, and is mounted on the wheel cover body.

According to the above-mentioned structure, mounting on the flexible annular member can be carried out with ease without using a separate mounting member. Further, as the intermediate retainer portion has the cross section larger than that of the through-hole, at least in the radial direction of the flexible annular member, the flexible annular member is not easily separated after it is mounted to the wheel cover body.

In the wheel cover of the above structure the flexible annular member can be formed, for example, of synthetic resin. In such a case, in order to simplify the constitution of a metal mold, it is preferable to construct the intermediate retainer portion of the retaining projection by the first retainer projecting outward in the radial direction of the flexible annular member and the second retainer projecting inward, and make the projection of the second retainer smaller than the projection of the first retainer.

There are a plurality of reasons for this structure. A metal mold for molding the flexible annular member of the wheel cover in which the projection amount of the second retainer is not limited as above, in general, has a core-side mold portion and a cavity-side mold portion which are divided generally by the face lying along the body of the flexible annular portion. The portion for molding each retaining projection comprises a radially outer slider (an outer split mold) and an inner slider (an inner split mold) which are mutually separable. However, in carrying out mold release of the solidified molding product, there is a problem that mutual interference of the inner sliders is apt to occur when they are shifted inward in the radial direction, since adjacent inner sliders approach each other.

On the contrary, by making the projection of the second retainer smaller as stated above, it becomes possible to carry out mold releasing by separating the two mold portions (core side and cavity side) by only sliding the outer sliders outward in the radial direction of the flexible annular member, with the portion corresponding the inner sliders fixed. In other words, as the inner slider becomes unnecessary, the structure of the mold can be simplified.

Further, in each of the above structure, it is preferable that the flexible annular member is provided with a wall projecting with the projection amount smaller than that of the base portion of the retaining projection on a line connecting the base portions of the adjacent retaining projections, and the wheel cover body is provided with a groove extending between the adjacent throughholes so as to receive the wall.

Unless the wall is formed, due to the individual provisions of the respective retaining projections on the reverse (second) face of the flexible annular member, molding sink corresponding to the retaining projection is apt to be formed on the surface of the flexible annular member while the molten resin is solidified. However, by connecting the space between the retaining projections with a wall as above, formation of the molding sink can be effectively prevented. When no wall is provided, there is a likelihood that, in case of the exertion of heat generated by, for example, the brake, the flexible annular member is deformed and will be undulated. However, when the wall is provided, it performs the role of a reinforcement, so that deformation by heat can be prevented.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
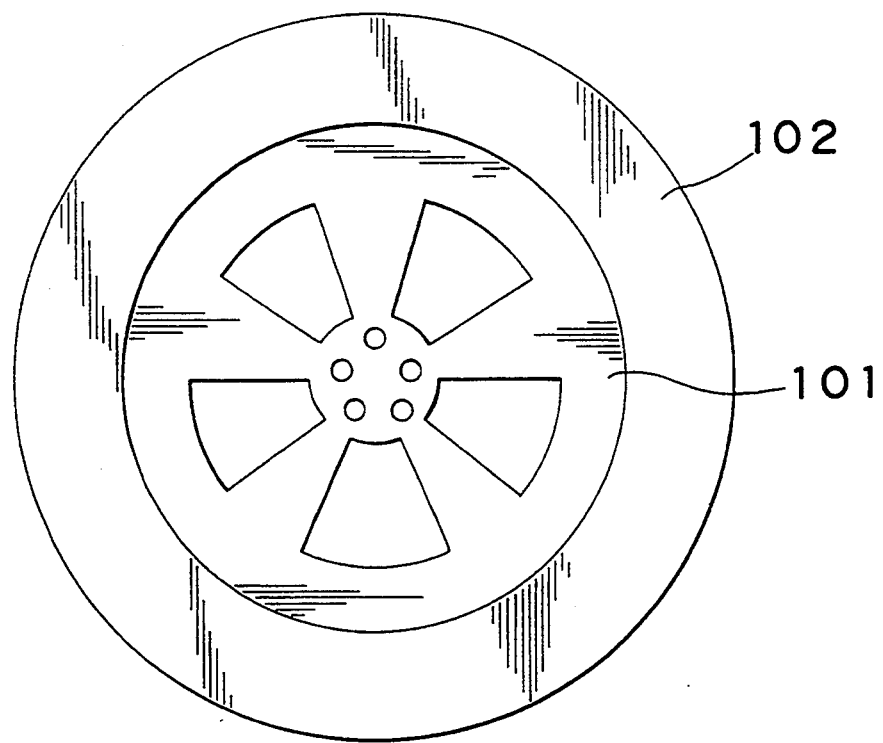
FIG. 1 is a front view of a prior art wheel cover comprising a wheel cover body and a flexible annular member.
Figure 2:
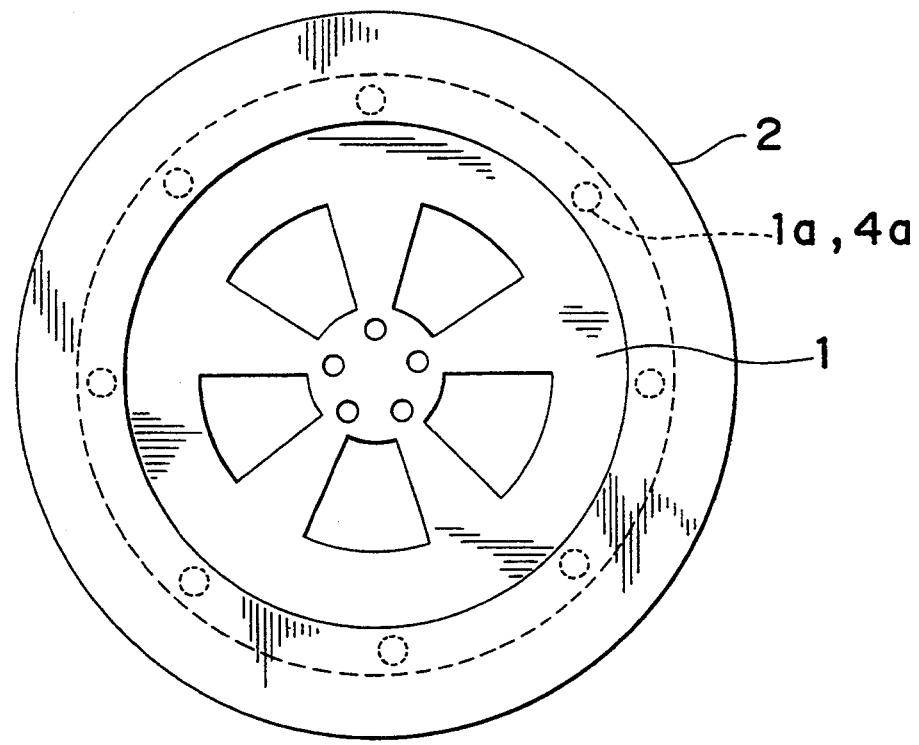
FIG. 2 is a front view of a wheel cover according to a first embodiment of the present invention.
Figure 3:
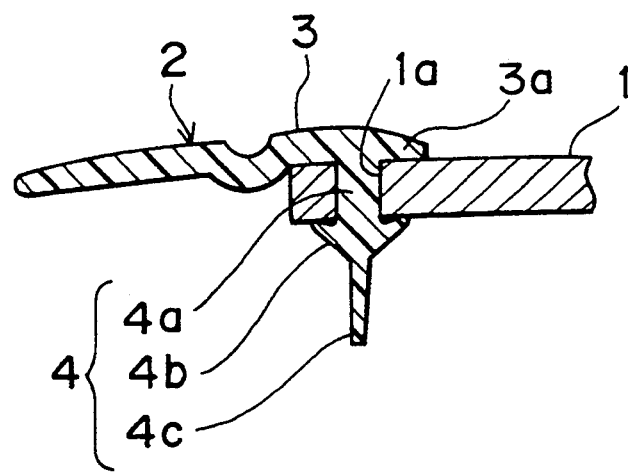
FIG. 3 is a sectional view of the wheel cover of the first embodiment.
Figure 4:
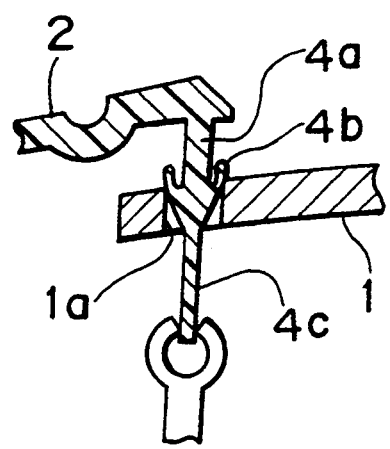
FIG. 4 is a sectional view of the wheel cover of the first embodiment showing a condition of mounting a flexible annular member to a wheel cover body.

A wheel cover for an automobile according to a first embodiment of the present invention as illustrated in FIGS. 2, 3 and 4 is explained in detail below.

The wheel cover has the structure of a wheel cover body 1 and a flexible annular member 2 positioned therearound. The wheel cover body 1 is formed in approximately a disk shape, and has its outer periphery of a plurality of through-holes 1a thrusting through in the direction of the thickness thereof.

The flexible annular member 2 is constituted by a body 3 having a shape so that the inner periphery 3a is overlaid on the outer periphery of the wheel cover body 1 and retaining projections 4 provided on the reverse (second) face of the body 3 at the position corresponding to the through-holes 1a of the wheel cover body 1. Each retaining projection 4 has a base portion 4a, an intermediate retainer portion 4b and an extremity grip portion 4c. The base portion 4a has a cross section which is substantially equal to that of the through-hole 1a of the wheel cover body 1 so as to be engaged therewith. The intermediate retainer portion 4b has a cross section of which a diameter is larger than that of the base portion 4a. The intermediate retainer portion 4b is formed so that it is constricted when it is pressed into the through-hole 1a and hold the wheel cover body 1 from both surface and reverse sides in collaboration with the body 3 of the flexible annular member 2 when the base portion 4a is engaged with the through-hole 1a. The slender extremity grip portion 4c has a smaller diameter than that of the through-hole 1a.

In this embodiment, in mounting the flexible annular member 2 onto the wheel cover body 1, each retaining projection 4 of the flexible annular member 2 is positioned corresponding to each through-hole 1a of the wheel cover body 1, and then the extremity grip portion 4c is inserted in the through-hole 1a. Then, as shown in FIG. 4, the extremity grip portion 4c is pulled from the side reverse to that inserted in the wheel cover body 1, and the intermediate retainer portion 4b is drawn into the through-hole 1a while being constricted. The extremity grip portion 4c is pulled further to draw out the intermediate retainer portion 4b from the through-hole 1a. At this time, the outer diameter of the intermediate retainer portion 4b which had been constricted regains the original size, and the base portion 4a is engaged with the through-hole 1a (FIG. 3). Accordingly, the flexible annular member 2 clamps the wheel cover body 1 from both sides with the inner periphery 3a and the intermediate retainer portion 4b, and is kept in a state of being mounted onto the wheel cover body 1.

As explained above, according to this embodiment, mounting of the flexible annular member 2 is made by utilizing its flexibility. Accordingly, this is different from the conventional case, this embodiment does not necessitate the working steps of caulking, and makes it easy to mount the flexible annular member 2 onto the wheel cover body 1. Further, as the wheel cover body 1 is securely held with the body 3 and the intermediate retainer portion 4b of the flexible annular member 2, once the mounting is made, disengagement of the flexible annular member 2 from the wheel can be prevented even if the side of the tire swells causing deformation.

In mounting the wheel cover of this embodiment to the wheel of automobile, there may arise a situation where the extremity grip portion 4c of the retaining projection 4 goes against a balance weight for wheel balancing (not illustrated). However, as the extremity grip portion 4c has flexibility and is easily bent, mounting the wheel cover to the right position is not prevented. Further, it is permitted to fit the flexible annular member 2 to the wheel cover body 1, and then to cut the extremity grip portion 4c according to necessity of the situation.

Next, the second embodiment as illustrated in FIGS. 5 through 8 is explained below.

Figure 5:
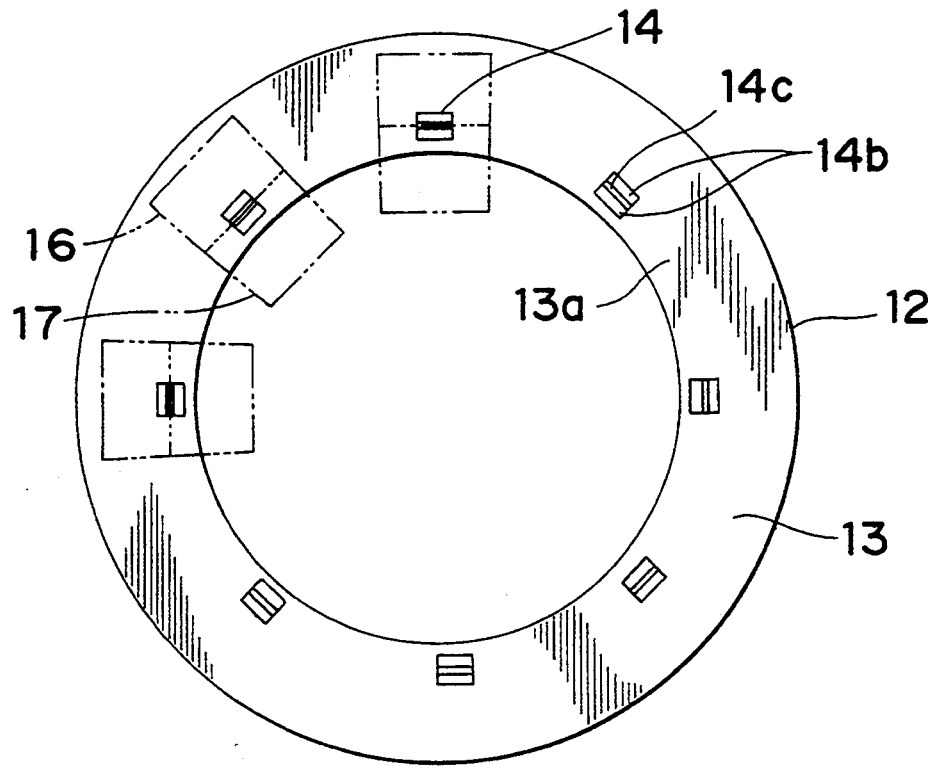
FIG. 5 is a rear view of a flexible annular member of a wheel cover according to a second embodiment of the present invention.
Figure 6:
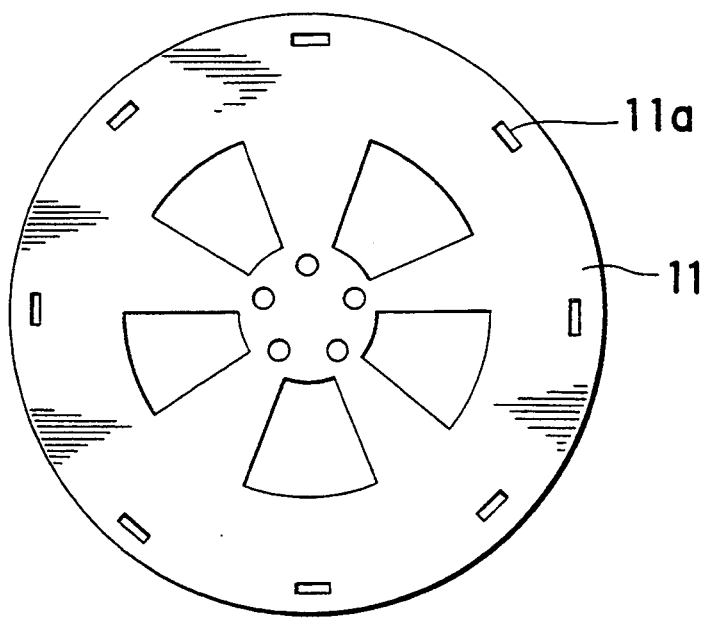
FIG. 6 is a front view of a wheel cover body of the wheel cover of the second embodiment.
Figure 7:
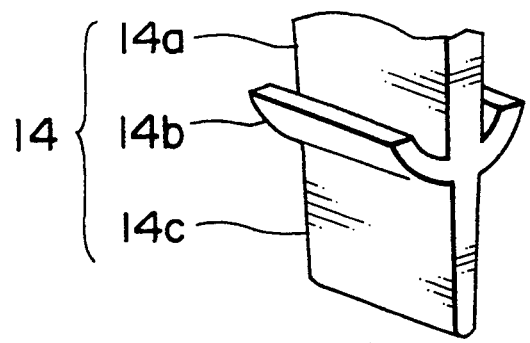
FIG. 7 is a perspective view of a retaining projection provided on the flexible annular member of the wheel cover of the second embodiment.

In the retaining projection 4 in the first embodiment, the base portion 4a, the intermediate retainer portion 4b, and the extremity grip portion 4c have circular cross sections respectively. The retaining projection 14 in this second embodiment is formed, at the inner periphery 13a of a body 13 of a flexible annular member 12, in the whole part in nearly a plate form, as shown in FIG. 7. A base portion 14a has a rectangular shape in section, and its long side is positioned in approximately orthogonal relationship with the radial line of the flexible annular member 12 (FIG. 5). Further, through-holes 11a of a wheel cover body 11 are formed as a rectangle having nearly the same length as the base portion 14a in both the long side and the short side, so as to accommodate the base portion 14a.

An extremity grip portion 14c of the retaining projection 14 has a rectangular cross section slightly smaller than that of the base portion 14a in both long side and short side, and is freely thrust through in the through-hole 11a of the wheel cover body 11. An intermediate retainer portion 14b projects inward and outward in the radial direction of the flexible annular member 12 from the boundary position between the base portion 14a and the extremity grip portion 14c. They have the shapes curved toward the body 13 of the flexible annular member 12, respectively. In this embodiment, the flexible annular member 12 can be easily mounted to the wheel cover body 11 (not shown), and once mounted, the flexible annular member 12 is securely held to the wheel cover body 11.

Figure 8:
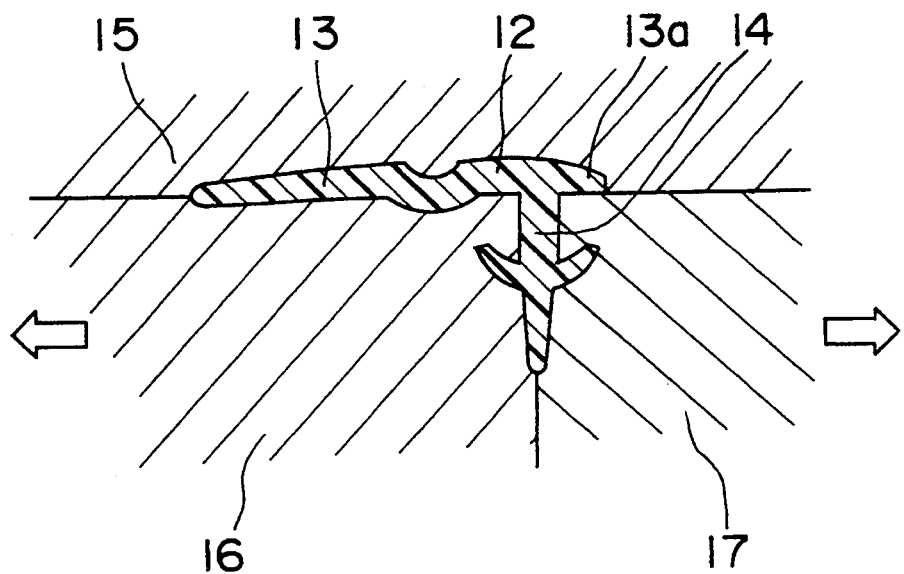
FIG. 8 is a sectional view of a metal mold for molding the flexible annular member of the second embodiment.
Figure 9:
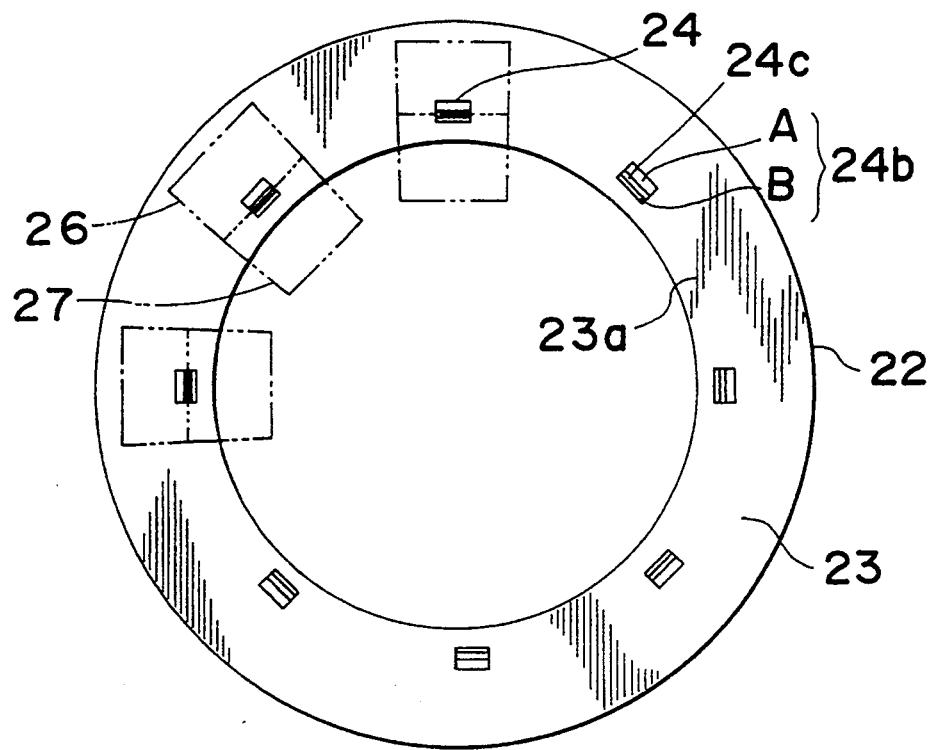
FIG. 9 is a rear view of a flexible annular member of a wheel cover according to a third embodiment of the present invention.
Figure 10:
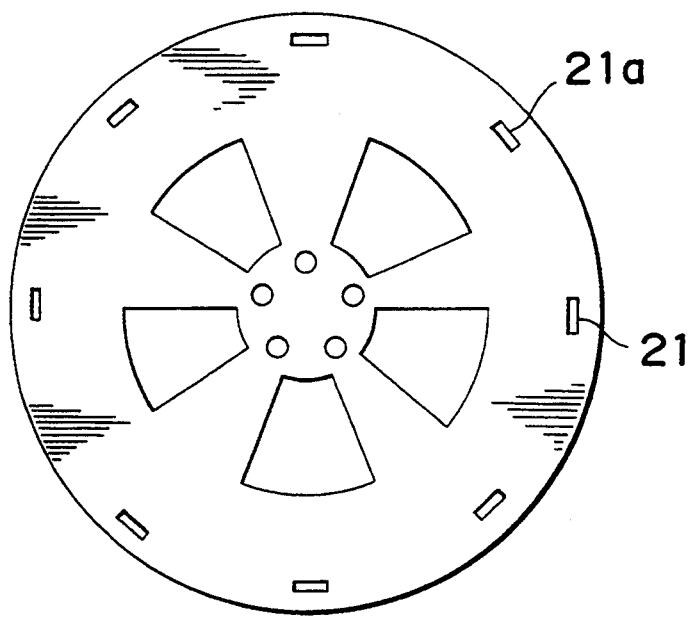
FIG. 10 is a front view of a wheel cover body of the wheel cover of the third embodiment.
Figure 11:
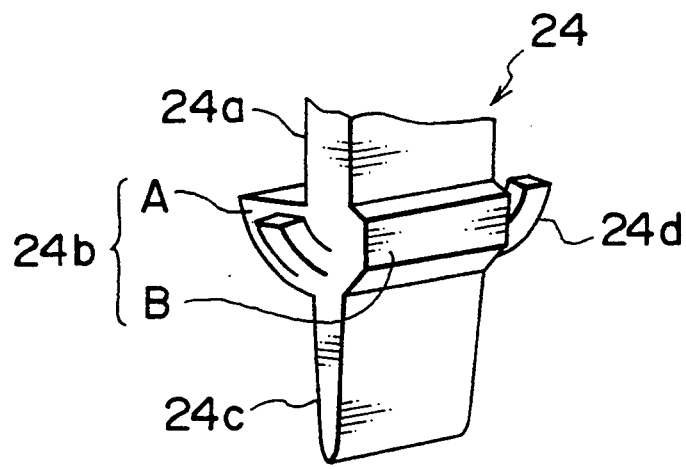
FIG. 11 is a perspective view of a retaining projection provided on the flexible annular member of the wheel cover of the third embodiment.
Figure 12:
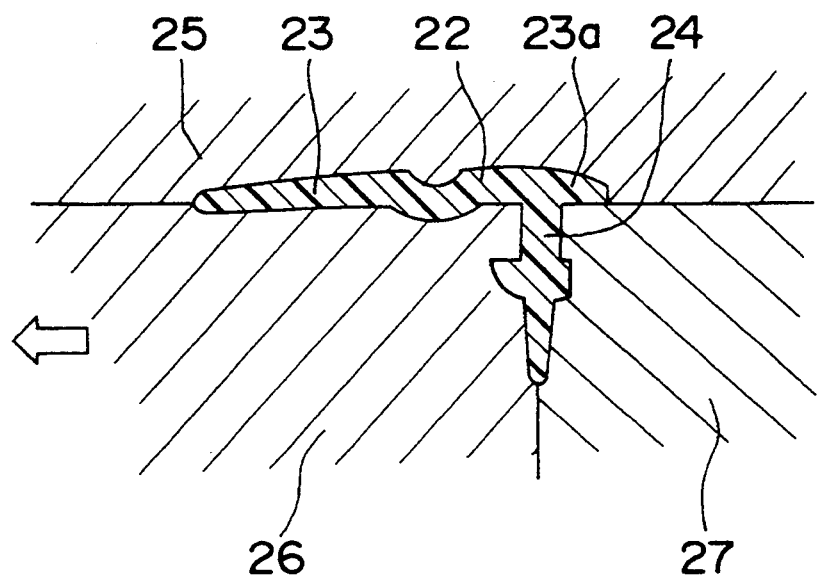
FIG. 12 is a sectional view of a mold for molding the flexible annular member of the third embodiment.

The flexible annular member 12 of this embodiment can be produced in injection molding of the synthetic resin by a mold whose approximate structure is shown in FIG. 8. In the figure, the part designated by 15 is an upper mold, 16 is an outer slider positioned at the outside of the retaining projection 14 in the radial direction, and 17 is an inner slider positioned at the inside of the retaining projection 14 in the radial direction. The outer and the inner sliders 16, 17 are comprised in a lower mold. Molding is carried out by filling the molten resin in the space between the clamped molds 15, 16 and 17, and then releasing the solidified molding product from the mold. In carrying out mold releasing, the outer slider 16 is caused to slide outward in the radial direction of the flexible annular member 12 and the inner slider 17 inward in the radial direction of the flexible annular member 12, and then the upper and the lower molds are separated relative to each other.

As shown in FIG. 5, the sliders 16 and 17 are required to be of the number corresponding to the retaining projections 14, because the directions of sliding (radial line direction) differ by the individual retaining projection 14. Accordingly, when all the inner sliders 17 are desired to be shifted inward in the radial direction, mutual interference is apt to occur. Therefore, it is difficult to take the shift amount for the inner slider 17 to be separated from the intermediate retainer portion 14b, in view of the designing of the mold, and the mold structure is apt to become complicated.

Next, the third embodiment, designed to make it possible to simplify the constriction of the mold, is illustrated with reference to FIGS. 9 through 12.

A wheel cover body 21 has through-holes 21a at the outer periphery thereof. A retaining projection 24 formed on an inner periphery 23a of a body 23 of a flexible annular member 22 is different from the retaining projection 14 of the second embodiment in the constriction of an intermediate retainer portion 24b only. This intermediate retainer portion 24b includes a first retainer A projecting outward in the radial direction of the flexible annular member 22 and a second retainer B projecting inward in the radial direction thereof. The first retainer A has a projection amount which is approximately the same as that of the second embodiment, but the projection amount of the second retainer B is very small and it has a shape of swelling only slightly from a base portion 24a and an extremity grip portion 24c. Also, as the projection amount of the second retainer B is small, in order to prevent loss of the holding force at the time when the flexible annular member 22 is mounted onto the wheel cover body 21, third retainers 24d projecting in the direction nearly orthogonal to the first retainer A and the second retainer B are formed at the boundary position between the base portion 24a and the extremity grip portion 24c.

The method of forming the flexible annular member 22 having the retaining projection 24 structure as described above, is explained with reference to FIG. 12. According to the metal mold of this embodiment, only the outside of the radial direction of the retaining projection 24 is made a slider 26, and the inside portion shown by the mark 27 is made into one-piece with the core side mold (lower mold). According to this embodiment, in molding releasing, the outer slider 26 is caused to slide outward in the radial direction of the flexible annular member 22, after which the lower molds 26 and 27 are released from the upper mold 25. In this case, while the second retainer B of the intermediate retainer portion 24b shows a tendency to remain in the recess of the core side mold 27, compulsory mold releasing is possible because the projection amount of the second retainer B is very small as stated above. Accordingly, in the flexible annular member 22 having the retaining projection 24 of this embodiment, the inner slider is unnecessary, so that the mold designing is facilitated.

Figure 13:
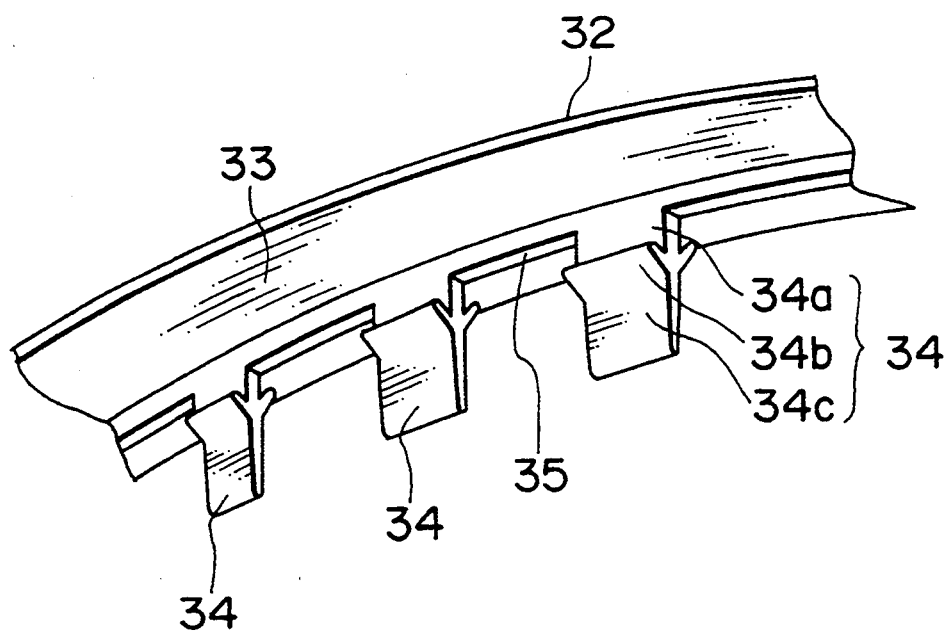
FIG. 13 is a perspective view of an essential part of a flexible annular member of a wheel cover according to a fourth embodiment of the present invention.
Figure 14:
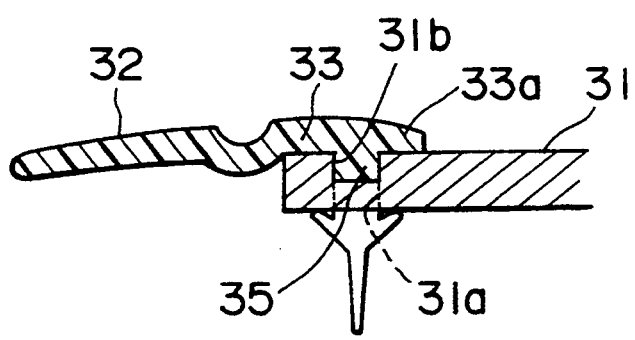
FIG. 14 is a sectional view of an essential part of the wheel cover of the fourth embodiment.

Next, the fourth embodiment as shown in FIGS. 13 and 14 is explained. A flexible annular member 32 of this embodiment has a wall 35 which projects on an inner periphery 33a of a body 33 of the flexible annular member 32, with the projection amount smaller than a base portion 34a, of a retaining projection 34 on a line connecting the base portions 34a of the adjacent retaining projections 34. Each retaining projection 34 has an intermediate retainer portion 34b and an extremity grip portion 34c both of which are formed similarly to the second embodiment. A wheel cover body 31 has a groove 31b extending between adjacent through-hole 31a so as to receive the wall 35.

In each of the foregoing embodiments, because the retaining projections 4, 14 and 24 are respectively individually provided on the reverse surface of the flexible annular members 2, 12 and 22 sink marks corresponding to the retaining projections 4, 14 and 24 are apt to be formed on the surface of the flexible annular members 2, 12 and 22 at the time of the solidification of the molten resin. However, in the present embodiment, because the space between the retaining projections 34 is connected with the wall 35, generation of molding sink can be prevented. Further, in any of the above embodiments, there is a likelihood that the flexible annular members 2, 12 and 22 are apt to be deformed and corrugated when the heat generated operation, for example, of the brake. However, in the present embodiment, as the wall 35 plays the role of the reinforcing member, deformation by heat can be prevented.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A wheel cover for an automobile, comprising:
   a wheel cover body being formed in approximately a disk shape and having at its outer periphery a plurality of through-holes thrusting through in the direction of thickness of the wheel cover body; and
   a flexible annular member, fitted and secured around the periphery of the wheel cover body, having a body having a first face and a second face and including an inner periphery which overlaps the outer periphery of the wheel cover body and retaining projections provided on the second face of the body at the position corresponding to the through-holes of the wheel cover body,
   each of the retaining projections having a base portion which is positioned at the base end of the retaining projection an to be engaged in the through-hole of the wheel cover body; an intermediate retainer portion which is positioned at the extremity side of the base portion and has a cross section larger at least in the radial direction of the flexible annular member than that of the base portion so as to be constricted when it is pressed into the through-hole and hold the wheel cover body in collaboration with the body when the base portion is engaged in the through-hole; and an extremity grip portion which is positioned at the extremity end of the retaining projection and has a cross section smaller than that of the through-hole of the wheel cover body.

2. The wheel cover for an automobile according to claim 1, wherein the intermediate retainer portion of the retaining projection has a first retainer projecting outward in the radial direction of the flexible annular member and a second retainer projecting inward in the radial direction thereof, and the projection amount of the second retainer is to be smaller than the projection amount of the first retainer.

3. The wheel cover for an automobile according to claim 1, wherein the flexible annular member has a wall projecting on a line connecting the base portions of the adjacent retaining projections with a projection amount smaller than that of the base portion, and the wheel cover body has a groove extending between the through-holes so as to receive the wall.

4. A flexible annular member for connection to a wheel cover body that includes a plurality of holes, the flexible annular member comprising:
   a body having a first face and a second face, and an inner periphery for overlapping an outer periphery of the wheel cover body with retaining projections provided on the second face of the body at a position to correspond to the through-holes of the wheel cover body,
   each of the retaining projections having a base portion which is positioned at the base end of the retaining projection and to be engaged in the through-hole of the wheel cover body; an intermediate retainer portion which is positioned at the extremity side of the base portion and has a cross section larger at least in the radial direction of the flexible annular member than that of the base portion so as to be constricted when it is pressed into the through-hole and hold the wheel cover body in collaboration with the body when the base portion is engaged in the through-hole; and an extremity grip portion which is positioned at the extremity end of the retaining projection and has a cross section smaller than that of the through-hole of the wheel cover body.

5. The flexible annular member according to claim 4, wherein the intermediate retainer portion of the retaining projection has a first retainer projecting outward in the radial direction of the flexible annular member and a second retainer projecting inward in the radial direction thereof, and the projection amount of the second retainer is to be smaller than the projection amount of the first retainer.

6. The flexible annular member according to claim 4, including a wall projecting on a line connecting the base portions of the adjacent retaining projections with a projection amount smaller than that of the base portion, and the wheel cover body has a groove extending between the through-holes so as to receive the wall.

* * * * *